United States Patent Office 3,415,353
Patented Dec. 10, 1968

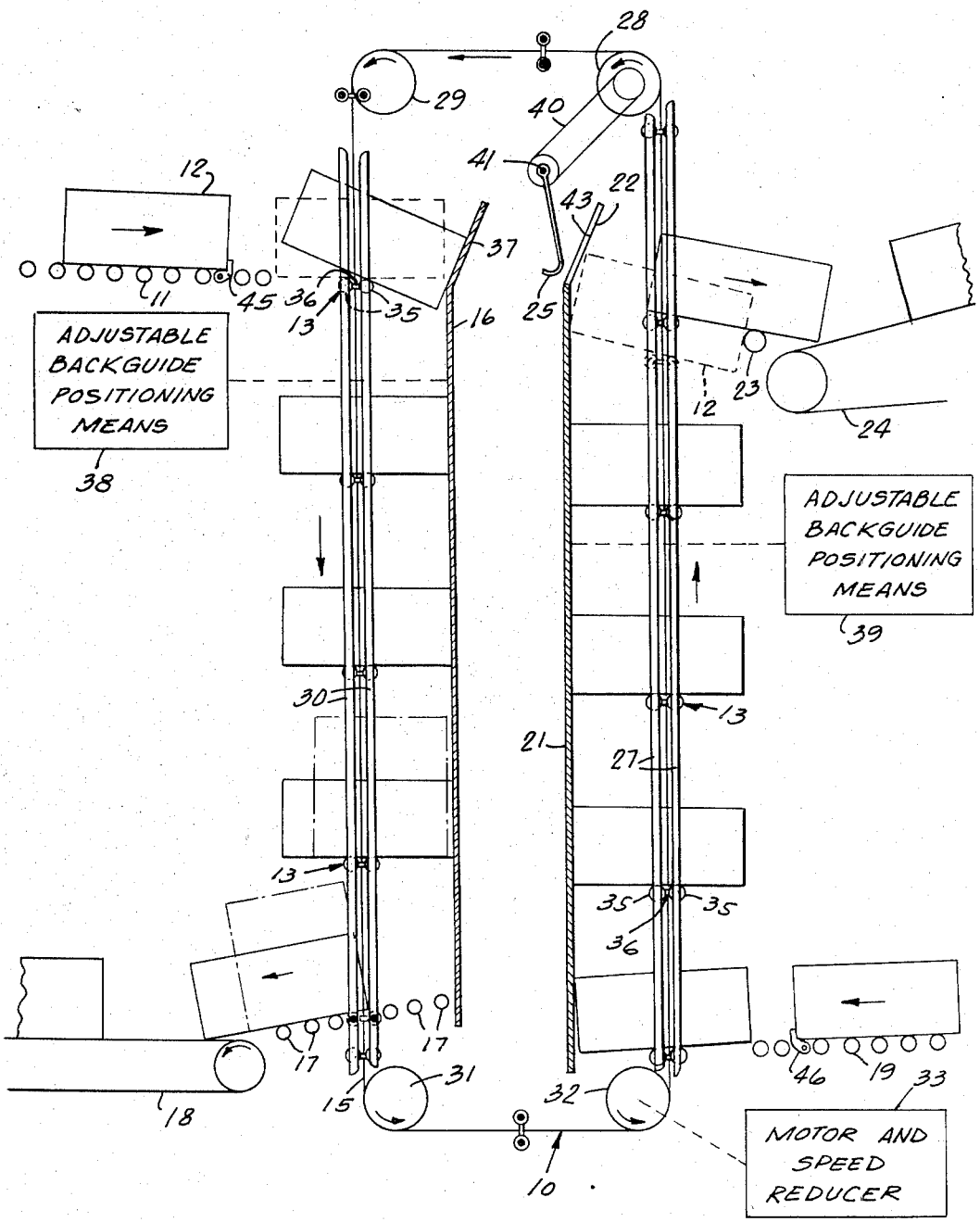

3,415,353
APPARATUS FOR SIMULTANEOUSLY ELEVATING
AND LOWERING PACKAGING ARTICLES
Lawrence C. Oertle, Jr., Random Lake, Wis., assignor to
H. G. Weber and Company, Inc., Kiel, Wis., a corporation of Wisconsin
Filed Oct. 7, 1966, Ser. No. 585,146
6 Claims. (Cl. 198—156)

ABSTRACT OF THE DISCLOSURE

Endless chain and flight conveyor for elevating and lowering packaging articles. Laterally spaced endless conveyor chains have roller flights connected at their ends to the chains and extending in the space between the chains. The uprunning flights serve as elevators while the downrunning flights serve to lower packaging articles. Individual back guides are spaced inwardly of the uprunning and downgoing flights distances sufficient to place the greater part of the weight of a packaging article toward the back guides and to bias the boxes against the back guides by gravity. These back guides are adjustable relative to the conveying runs of the conveyor in accordance with the size of article being elevated or lowered. The packaging articles are loaded onto the flights to engage the back guides by roller ramps and are discharged from the downrunning flights by roller ramps extending in the path of travel of the packaging articles and spaced from the conveyor chains distances sufficient to accommodate the flights to pass through the roller ramps. The packaging articles on the elevating run are ejected from this run of the conveyor by a rotating camming ejector engaging a packaging article as the article is elevated to a discharge position.

Summary and objects of the invention

This invention relates to improvements in apparatus for transferring packaging articles between different levels.

A principal object of the invention is to provide an article handling device for elevating packaging articles such as boxes, barrels and the like and at the same time lowering other articles and arranged with a view toward utmost compactness and simplicity in construction and operation.

Another object of the invention is to provide a simple and improved article handling device in the form of a conveyor having two oppositely moving vertical material carrying runs particularly adapted for raising packaging articles at the same time other packaging articles are being lowered.

Still another object of the invention is to provide a vertical conveyor having two material carrying runs with adjustable back guides in association with each run, independently adjustable to enable the conveyor to elevate packaging articles of one size and at the same time lower packaging articles of a different size.

Still another object of the invention is to provide a single elevating and lowering conveyor having back guides maintaining packaging articles in position on the conveyor as raised and lowered, with a simplified form of ejecting means ejecting packaging articles from the conveyor, and accommodating loading and unloading of the packaging articles while the conveyor is in continuous operation.

These and other objects of the invention will appear from time to time as the following specification proceeds and with reference to the accompanying drawing in which the figure is a diagrammatic side view of an article elevating and lowering apparatus constructed in accordance with the principles of the present invention.

In the embodiment of the invention illustrated in the drawing, I have shown an elevating and lowering endless conveyor 10 for packaging articles such as boxes, barrels and the like and having two oppositely moving verticle runs, with an inclined ramp 11 delivering packaging articles 12 to downwardly moving flights 13 of a conveyor 10 against a back guide 16. The apparatus also includes an inclined delivery ramp at the lower end portion of the conveyor having a plurality of freely rotatable rolls 17 spaced on opposite sides of the flights 13, and engaging the articles 12 as the flights pass thereby and delivering the articles to a conveyor 18 for further processing.

The upwardly moving run of the conveyor 10 has an inclined roller ramp 19, delivering packaging articles 12 to the flights 13 of the conveyor against a back guide 21. The back guide 21 has an inclined upper end converging toward the upwardly moving run of the conveyor 10 and camming packaging articles past their center of gravity to engage and be held to the flights 13 by a guide and support roll 23, disposed above the receiving end of a delivery conveyor 24.

An ejector cam 25 is provided to successively cam the packaging articles from their flights along the roll 23 onto the conveyor 24, as the bottom of the packaging article passes to the plane of the material carrying surface of the roll 23.

The conveyor 10 may be a well known form of chain and flight conveyor including pairs of laterally spaced endless chains 15 having the flights 13 connected therebetween.

As diagrammatically shown in the drawing the chains 15, 15 pass from the space between laterally spaced pairs of upcoming guides 27, 27 about laterally spaced idler sprockets 28, 28 having pitch circles tangentially to the space between said upcoming guides. From the sprockets 28, 28 the chains pass horizontally to idler sprockets 29, 29 having pitch circles tangential to the space between laterally spaced pairs of downrunning guides 30, 30 terminating above lower idler sprockets 31, 31 tangential to the space between said downrunning guides. From thence the chains pass to drive sprockets 32, 32 suitably driven from a motor and speed reducer 33. The motor and speed reducer 33 and the drive from said motor and speed reducer to the drive sprockets 32, 32 may be of any conventional form and is no part of the present invention so need not herein be shown or described in detail.

The conveyor chains 15, 15 with the flights 13, 13 connected therebetween are thus guided for movement between the pairs of laterally spaced guides 27, 27 and 30, 30, retaining the chains in alignment and from weaving or twisting, and maintaining the flights in aligned relation during material carrying travel thereof. As diagrammatically shown in FIGURE 1, one chain and one set of guides 27, 27 and 30, 30 only are shown.

The flights 13, 13 are connected between the chains 15, for limited tilting movement with the packaging articles 12 as picked up or discharged. Each flight 13 generally includes a pair of spaced rollers 35, 35 rotatably mounted at their opposite ends to links (not shown) of the chain on attachments 36 and forming a rolling support for a packaging article 12, as loaded thereonto and mounted to tilt with the article a limited amount, and to thereby accommodate the packaging article to be loaded thereonto into engagement with an associated back stop, depending upon whether the packaging article is on the downrunning or lowering or uprunning or elevating run of the conveyor.

The flights 13, 13 are like those shown and described in an application Ser. No. 505,323 filed by Robert L. Beninger on Oct. 27, 1965, and assigned to the assignee of the present invention, so not herein shown or described further.

As shown in the drawing the back guide 16 has a diverging upper end portion 37 diverging from the down-running run of the conveyor at the angle of engagement of the box with the back guide, and accommodating the box to move into a generally horizontal position during lowering movement of its supporting flight 13. The back stop 16 is spaced from the centers of the chains 15 a distance greater than the distance from the adjacent end of the box to the center of gravity of the box, to accommodate the box to move along the back guide 16 upon downward movement of its supporting flight 13, and to engage said guide by gravity, to be discharged from the conveyor along the rolls 17 onto the conveyor 18 as the flights pass beneath the plane of the material carrying surfaces of said rolls.

The back guide 16 may be adjusted by operation of suitable back guide positioning means 38 which may be of any conventional form. The positioning means 27 may position the guide in accordance with the type and size of packaging articles being lowered and thereby assure that the packaging articles will be supported on the flight in engagement with the guide by gravity, during lowering movement thereof.

The back guide 21 is adjustably moved by a suitable back guide positioning means 39 independently of adjustment of the back guide 16, to enable the upgoing run of the conveyor to convey boxes or other packaging articles of different types and sizes than those lowered by the downgoing run of the conveyor.

The ejector cam 25 is rotatably driven from one idler sprocket 28 through a one to one drive, which may be a chain and sprocket drive 40, driving a transverse support and drive shaft 41 for said ejector cam and drives said ejector cam to make one revolution each time a flight moves up to a delivery position. The ejector cam 25 moves within a slot 43 in the converging upper end portion 22 of the back guide 21, for camming a box 12 or other packaging article to move along the material carrying surface of the roller 23 onto the conveyor 25, as the bottom of the packaging article 12 is elevated to a plane tangential with the plane of the material carrying surface of the roller 23.

It will be noted from the drawing, that as a box reaches the converging upper end portion 22 of the back guide 21, the surface of said guide converging toward the conveyor chain 15 and flights 13 will tilt the box about the flights 13 to engage the roller 23 at its outer end. The roller 23 will thus cooperate with the flights 13 and retain the box to said flights until the bottom of the box is tangential with the material carrying surface of the roller. At this time the camming ejector 25 may cam the box onto the conveyor 24 to be carried away by said conveyor.

A retractable stop 45 is shown as having cooperative association with the upper delivering roller ramp 11 while a similar retractable stop 46 is shown as having operative association with the lower delivery ramp 19. The stops 45 and 46 may be retracted in timed relation with respect to the positions of the flights 13 of the conveyor, to successively release a packaging article, as the flights are in article receiving positions, under the control of limit switches or other timed control means (not shown), in a manner similar to which the retractable stop of application Ser. 505,323 is timed and actuated, and no part of the present invention is not herein shown or described further.

It may be seen from the foregoing that a novel and improved balanced elevating and lowering apparatus has been provided for elevating packaging articles from one level to another as other packaging articles are lowered, and that the device is constructed and arranged as to be automatically operable with little if any attention from the operator of the apparatus once the apparatus is set in motion.

It may be further seen that the apparatus of the present invention eliminates the need for separate elevators and loweraters and thereby effects a substantial saving in space, where it is required that packaging articles be elevated and lowered in the same general location, and at the same time reduces the power requirements, and besides saving in space affords a simple and efficient apparatus for raising and lowering packaging articles from one floor to another, in which the apparatus is balanced by the oppositely moving loads thereon.

I claim as my invention:
1. I an appartus for elevating and lowering packaging articles,
   an endless conveyor having at least two horizontally spaced oppositely moving vertical material carrying runs,
   article carrying flights carried by said vertical runs of said conveyor,
   back guides spaced inwardly of said vertical runs distances greater than the distances from the centers of gravity of the articles to the ends thereof, adjacent said back guides, to effect biasing of the articles against said back guides,
   means successively loading packaging articles onto the downwardly moving vertical run of said conveyor adjacent the upper end portion of said back guide,
   other means successively loading packaging articles onto the upwardly moving vertical run of said conveyor against said back guide,
   ejector means in association with the downwardly moving run of said conveyor comprising
   an inclined roller ramp having article supporting rollers spaced on opposite sides of the flights of the conveyor,
   delivery means for the elevating run of the conveyor comprising
   at least one roll spaced laterally of the elevating run of the conveyor and forming a delivery station and retaining articles to their flights as they pass thereby, and
   ejector means for effecting the ejection of packaging articles from the elevating run of the conveyor along said roll comprising
   an ejector cam in association with the elevating run of the conveyor and adjacent the upper end of the back guide therefor and rotatably driven about a fixed pivotal axis to engage the back vertical walls of the packaging articles on said flights and to successively cam packaging articles from said flight after they pass above the top surface of said roll.

2. The structure of claim 1 wherein the back guides are independently adjustable toward and from the material carrying runs of the conveyor, to accommodate one run of the conveyor to carry packaging articles of a different size from those carried by the other run of the conveyor.

3. The structure of claim 1,
   wherein the back guides extend parallel to each other, and
   wherein means are provided for adjustably moving said back guides independently of each other to accommodate individual adjustment of said back guides in accordance with the centers of gravity of the articles being elevated and lowered, and to thereby accommodate one run of the conveyor to convey packaging articles of one size and the other run of the conveyor to convey packaging articles of a different size.

4. The structure of claim 1,
   veyor is positioned to be engaged by an end of the article as deflected outwardly by said back guide
   wherein the back guide in association with the elevating run of the conveyor converges toward the conveyor at the upper end portion thereof,
   wherein the roll spaced laterally outwardly of the conand to retain the article to a flight during upward movement thereof, and wherein the ejector means cooperates with said converging portion of said back guide, to eject the packaging article from its flight along said roll as the bottom of the article is raised above the surface of said roll.

5. The structure of claim 4, wherein the ejector means comprises an ejector cam disposed behind said converging portion of said back guide and rotatably driven by said conveyor to successively come into packaging article ejecting association with the articles elevated into position to move over said roll.

6. The structure of claim 4, wherein the means loading packages onto the downwardly and upwardly moving runs of the conveyor comprise roller ramps, and wherein the means for ejecting articles from the downwardly moving runs of the conveyor comprises an inclined roller ramp having article supporting rollers spaced on opposite sides of the flights of the conveyor.

References Cited

UNITED STATES PATENTS

| | | | |
|---|---|---|---|
| 1,193,118 | 8/1916 | Buck | 198—28 |
| 1,302,631 | 5/1919 | Buck | 198—156 |
| 3,184,032 | 5/1965 | Jonsson | 198—156 |

RICHARD E. AEGERTER, *Primary Examiner.*

U.S. Cl. X.R.

198—28